United States Patent
Hallman et al.

(10) Patent No.: US 6,393,424 B1
(45) Date of Patent: May 21, 2002

(54) METHOD AND APPARATUS FOR USING A STATIC METADATA OBJECT TO REDUCE DATABASE ACCESSES

(75) Inventors: Clinton J. Hallman, San Jose; Leslie W. Vaughn, Jr., Saratoga; David Forney, Cupertino, all of CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/474,601

(22) Filed: Dec. 29, 1999

(51) Int. Cl.$^7$ .............................................. G06F 17/30
(52) U.S. Cl. .......................... 707/10; 707/104; 709/201
(58) Field of Search ..................... 707/10, 104; 709/201

(56) References Cited

U.S. PATENT DOCUMENTS

| | | | | |
|---|---|---|---|---|
| 5,721,925 A | * | 2/1998 | Cheng et al. ................ | 707/103 |
| 6,061,692 A | * | 5/2000 | Thomas et al. ............. | 707/200 |
| 6,112,210 A | * | 8/2000 | Nori et al. ................... | 707/103 |
| 6,134,558 A | * | 10/2000 | Hong et al. .................. | 707/103 |
| 6,226,649 B1 | * | 5/2001 | Bodamer et al. ........... | 707/104 |
| 6,236,997 B1 | * | 5/2001 | Bodamer et al. ............. | 707/10 |
| 6,266,673 B1 | * | 7/2001 | Hong et al. .................. | 707/103 |
| 6,289,358 B1 | * | 9/2001 | Mattis et al. ................ | 707/203 |

FOREIGN PATENT DOCUMENTS

EP          0489861 B1  *  9/1997  ............. G06F/9/44

* cited by examiner

Primary Examiner—Frantz Coby
(74) Attorney, Agent, or Firm—Park, Vaughan & Fleming LLP

(57) ABSTRACT

One embodiment of the present invention provides a system that retrieves metadata from a memory within a server, so that the server does not have to access a database in order to retrieve the metadata. The system operates by receiving a request from a client, which causes an operation to be performed on data within the database. In response to the request, the system retrieves the metadata through a metadata object, which retrieves the metadata from a random access memory in the server. Note that this metadata specifies how the data is stored within the database. The system then performs the operation on the data within the database by using the metadata to determine how the data is stored within the database. Note that this metadata object can be used to service requests from a plurality of clients. Hence, client sessions can share the same metadata, which can greatly reduce the amount of memory used by client sessions. In one embodiment of the present invention, the metadata object contains static metadata specifying how tables and views are organized within the database. In one embodiment of the present invention, the system accesses the metadata object through a generic object on the server.

27 Claims, 4 Drawing Sheets

METHOD AND APPARATUS FOR USING A STATIC METADATA OBJECT TO REDUCE DATABASE ACCESSES

BACKGROUND

1. Field of the Invention

The present invention relates to server computer systems and databases. More specifically, the present invention relates to a method and an apparatus for accessing static metadata located within a memory within a server through a static metadata object so that the server does not have to access a database in order to retrieve the static metadata.

2. Related Art

The rise of the Internet and the world wide web is dramatically changing the way in which computational tasks are performed. Under the previous client-server model, "fat client" computing systems would request services from server computer systems. These fat client computing systems typically performed much of the computational work involved in executing an application, and would typically make relatively minor demands on a server computer system for data storage and/or computational resources.

In the current web-based computing model, web browsers on client computing systems make demands on web servers located on server computer systems. These web browsers act as "thin clients," because they typically perform only limited amounts of computation locally on the client computer system. Web browsers instead rely on web servers and middle layers to perform most of the computational work involved in executing an application.

This web-based computing model can place a tremendous load on server computing systems because they are often interacting within large numbers of browsers at any given time. In fact, some web sites receive more than 1,000,000 hits on web pages each day. This means that thousands of browsers can potentially be interacting with a web site at the same time.

With so many browser sessions active at the same time, it is impractical for a server computer system to maintain a significant amount of information in the memory for each of the browser sessions. One solution to this problem is to store all static data about a browser session in a database, and to retrieve the static data from the database when necessary. This reduces the memory requirements for the server computer system, but also creates additional database accesses, which can greatly reduce system performance. For example, an access to a data item in the database may require a first database access to retrieve static metadata describing the structure of the data to be accessed, and then a second database access to retrieve the data itself.

Hence, what is needed is a method and an apparatus that allows a server to store metadata for client sessions in the memory of the server without storing a large amount of data for each client session.

SUMMARY

One embodiment of the present invention provides a system that retrieves metadata from a memory within a server, so that the server does not have to access a database in order to retrieve the metadata. The system operates by receiving a request from a client, which causes an operation to be performed on data within the database. In response to the request, the system retrieves the metadata through a metadata object, which retrieves the metadata from a random access memory in the server. Note that this metadata specifies how the data is stored within the database. The system then performs the operation on the data within the database by using the metadata to determine how the data is stored within the database. Note that this metadata object can be used to service requests from a plurality of clients. Hence, client sessions can share the same metadata, which can greatly reduce the amount of memory used by client sessions.

In one embodiment of the present invention, the system includes a service that automatically loads metadata into random access memory.

In one embodiment of the present invention, if the metadata is not located within the random access memory in the server, the system retrieves the metadata from the database.

In one embodiment of the present invention, the metadata object contains static metadata specifying how tables and views are organized within the database.

In one embodiment of the present invention, the system accesses the metadata object through a generic object on the server.

In one embodiment of the present invention, the operation on the database includes one of, writing the data to the database, reading the data from the database, and creating an entry in the database.

In one embodiment of the present invention, the metadata object is implemented as an object adhering to the common object model (COM) standard.

In one embodiment of the present invention, the request is received from a browser on the client at a web site on the server.

In one embodiment of the present invention, the system uses the metadata to render a form for accepting input from a user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
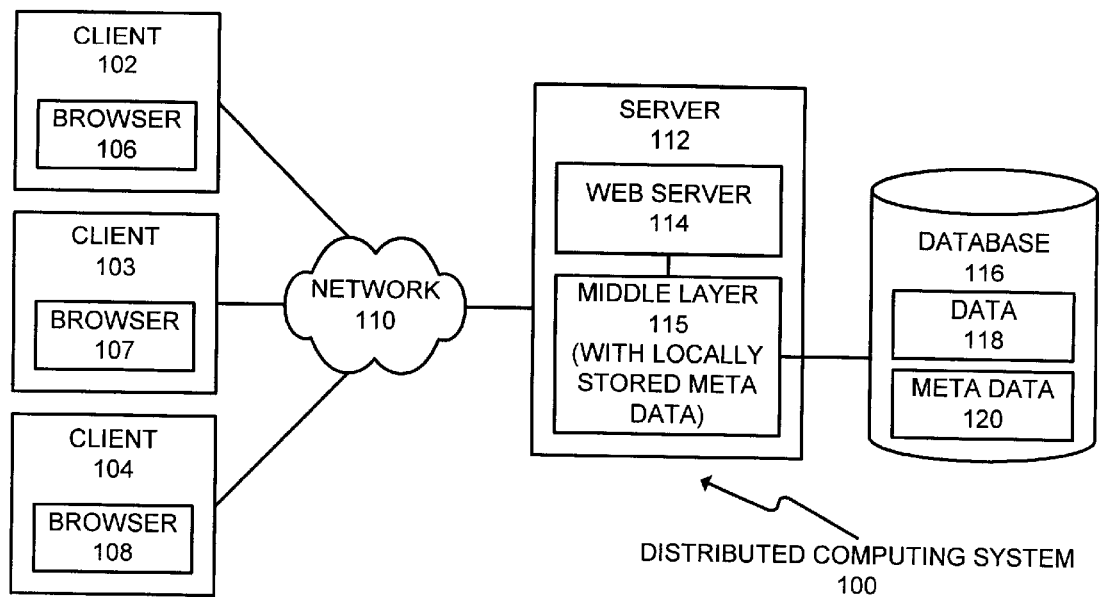
FIG. 1 illustrates a distributed computing system in accordance with an embodiment of the present invention.

FIG. 1 illustrates a distributed computing system 100 in accordance with an embodiment of the present invention. Distributed computing system 100 includes clients 102-104, which are coupled with server 112 through network 110. Network 110 can include any type of wire or wireless communication channel capable of coupling together computing nodes. This includes, but is not limited to, a local area network, a wide area network, or a combination of networks. In one embodiment of the present invention, network 110 includes the Internet.

Server 112 can include any computational node with a mechanism for servicing requests from a client for computational or data storage resources. Note that server 112 includes web server 114. Web server 114 acts as a host for at least one web site that provides web pages for browsers that communicate with web server 114. Web server 115 communicates with middle layer 115, which contains metadata that is locally stored within memory in server 112.

Note that middle layer 115 is the middle layer in a three-tier architecture. The top tier of the architecture (which is often referred to as the client) typically performs user interface functions. This top tier includes browsers 106-108 as well as web server 114. The middle tier includes middle layer 115 and typically performs business logic functions. The bottom tier includes database 116 and typically stores data.

Middle layer 115 within server 112 communicates with database 116. Database 116 contains data 118 that is accessed by web server 114. Database 116 also contains a backup copy of metadata 120 that is stored in memory within server 112. In one embodiment of the present invention, database 116 is located on the same computational node as server 112. In another embodiment, database 116 is located on a separate computational node from server 112, and communications between server 112 and database 116 take place across a network, such as network 110.

Clients 102–104 can include any node on network 110 including computational capability and including a mechanism for communicating across network 110 to request services from a server, such as server 112.

Note that clients 102–104 contain browsers 106–108, respectively. Browsers 106–108 can include any type of browser for viewing web pages supplied by web server 114 on server 112. For example, browsers 106–108 can include a version of the Internet Explorer browser produced by the Microsoft Corporation of Redmond, Wash.

Note that although the present invention is described in the context of distributed computing system 100 as is illustrated in FIG. 1, the present invention can generally be applied to any type of computer system in which a server caches data for clients. Hence, the present invention is not limited to a distributed computing system that employs web servers and web browsers as is illustrated in FIG. 1.

Web Server and Middle Layer

Figure 2:
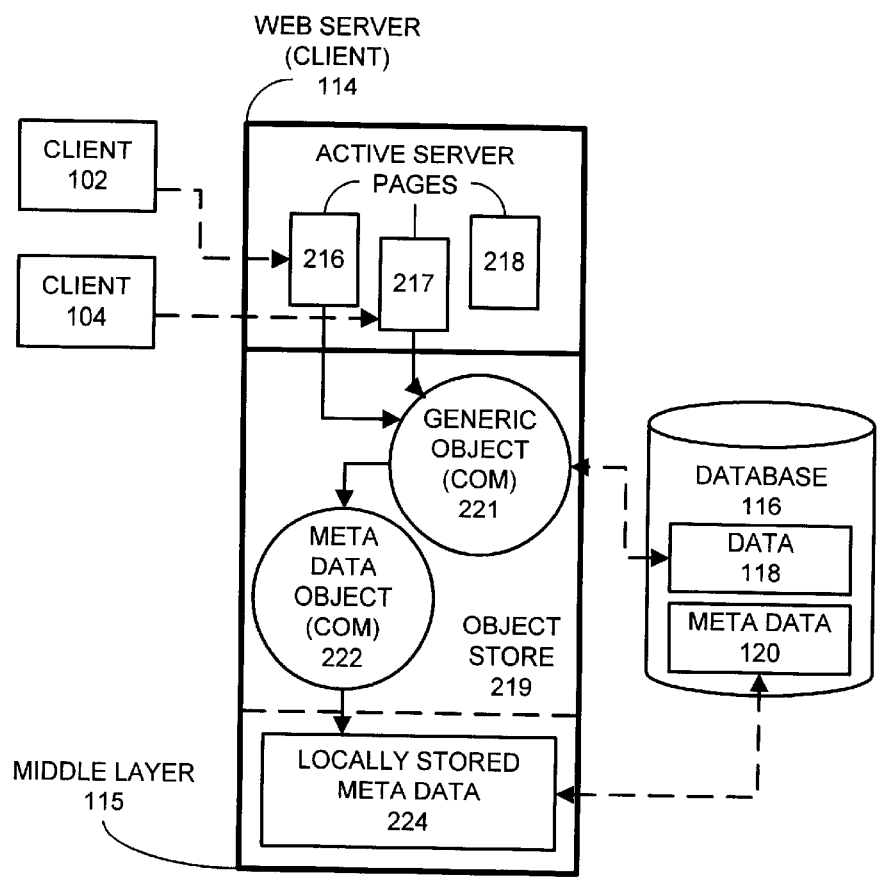
FIG. 2 illustrates the structure of a web server in accordance with an embodiment of the present invention.

FIG. 2 illustrates the structure of web server 114 and middle layer 115 from FIG. 1 in accordance with an embodiment of the present invention. Web server 114 includes active server pages (ASPs) 216–218, which communicate with generic object 221 in object store 219. In one embodiment of the present invention, ASPs 216–218 are defined within the Internet Information Server (IIS) that is distributed by the Microsoft Corporation of Redmond, Wash.

ASPs 216–218 communicate with common object model (COM) objects within middle layer 115. These COM objects include generic object 221 and metadata object 222.

Generic object 221 contains interfaces for functions such as "create," "delete," and "update." In performing these functions, generic object 221 takes in parameters specifying an object to operated on, data involved in the operation and an action to be performed using the data. Note that generic object 221 can be accessed by different ASPs 216 and 217 that are associated with different clients 102 and 103. This allows clients 102 and 103 to share the same generic object 221, which can greatly reduce memory usage within server 112.

Generic object 221 retrieves metadata from metadata object 222. Metadata object 222 accesses locally stored metadata 224 that is located within memory in middle layer 115, if possible.

Note that generic object 221 also communicates with database 116 to retrieve data 118. Also note that metadata object 222 can retrieve required metadata from metadata 120 in database 116, if the required metadata is not present in locally stored metadata 224.

Web server 114 operates generally as follows. Clients 102 and 103 communicate with ASPs 216 and 217, respectively, within web server 114. Clients 102 and 103 cause server-side scripts within ASPs 216 and 217 to be triggered. These server-side scripts cause operations to be performed by generic object 221. In performing these operations, generic object 221 requests metadata from metadata object 222. Metadata object 222 retrieves the metadata from locally stored metadata 224 if possible. Otherwise, metadata object 222 retrieves the metadata from metadata 120 in database 116.

Generic object 221 uses the metadata to gain information about the format of data within database 116. This information allows generic object 221 to access data 118 within database 116.

Generic Object

Figure 3:
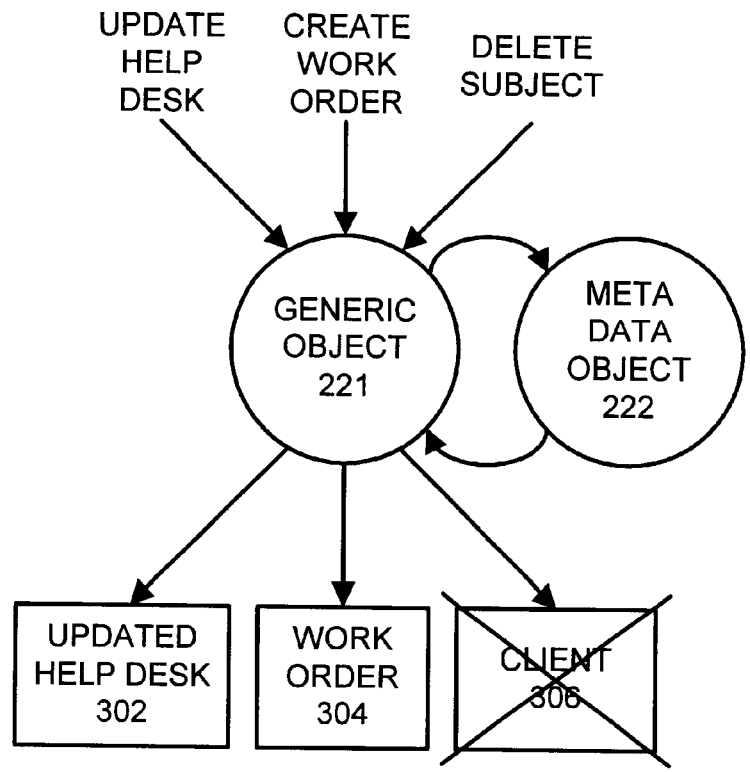
FIG. 3 illustrates how a generic object can be used to manipulate different types of data objects in accordance with an embodiment of the present invention.

FIG. 3 illustrates how a generic object can be used to manipulate different types of data objects in accordance with an embodiment of the present invention. For example, FIG. 1 illustrates generic object 221 as receiving commands to update a help desk object 302, to create a work order object 304 and to delete a client object 306. This example illustrates objects that are involved in a customer support application. In this example, clients of the help desk cause work orders to be created in order to receive service from the help desk.

The commands received by generic object 221 include parameters that specify the operations to be performed on the objects. In performing these commands, generic object 221 accesses metadata object 222 to retrieve metadata that describes the format of the data that is manipulated by the commands. Generic object 221 uses this metadata to produce an updated help desk object 302 and to produce a new work order object 304. Generic object 221 additionally uses this metadata to delete client object 306.

Server Page

Figure 4:
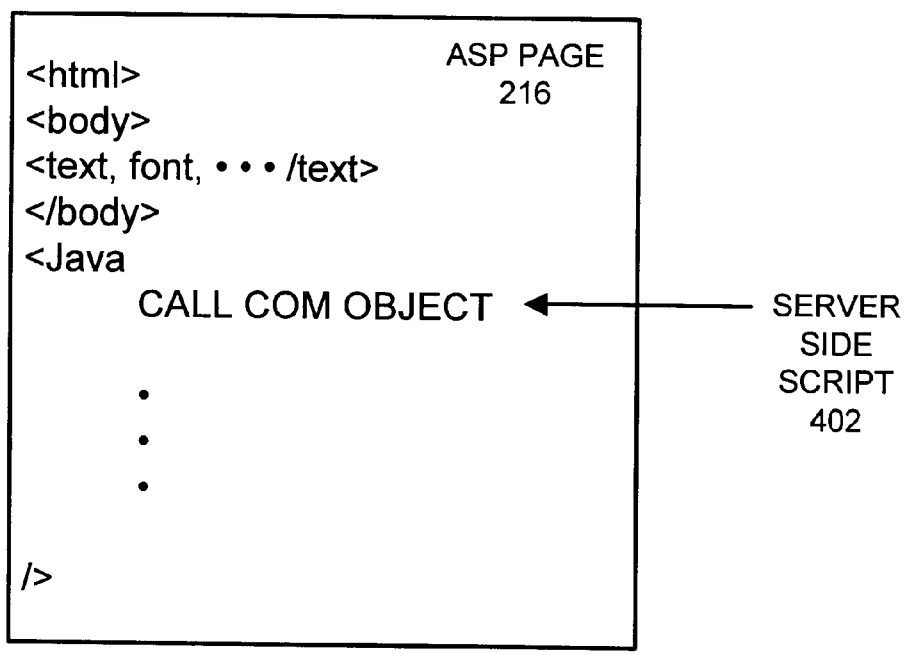
FIG. 4 illustrates the structure of a server page in accordance with an embodiment of the present invention.

FIG. 4 illustrates the structure of an ASP 216 in accordance with an embodiment of the present invention. ASP 216 contains a description of a server page in Hypertext Markup Language (HTML) code. This HTML code specifies the structure of a web page by specifying parameters, such as text to be displayed in the web page and a font for the text. Another region of ASP 216 contains code in the JAVA™ programming language, which includes a server side script that makes a call to a COM object. (Note that Java is a registered trademark of Sun Microsystems, Inc. of Palo Alto, Calif.)

For example, if ASP 216 specifies a form for receiving data from a user, ASP 216 can call generic object 221, which creates a form for receiving user input. In order to create this form, generic object 221 calls metadata object 222, which retrieves metadata specifying the fields that need to be created in the form.

Process of Using Metadata

Figure 5:
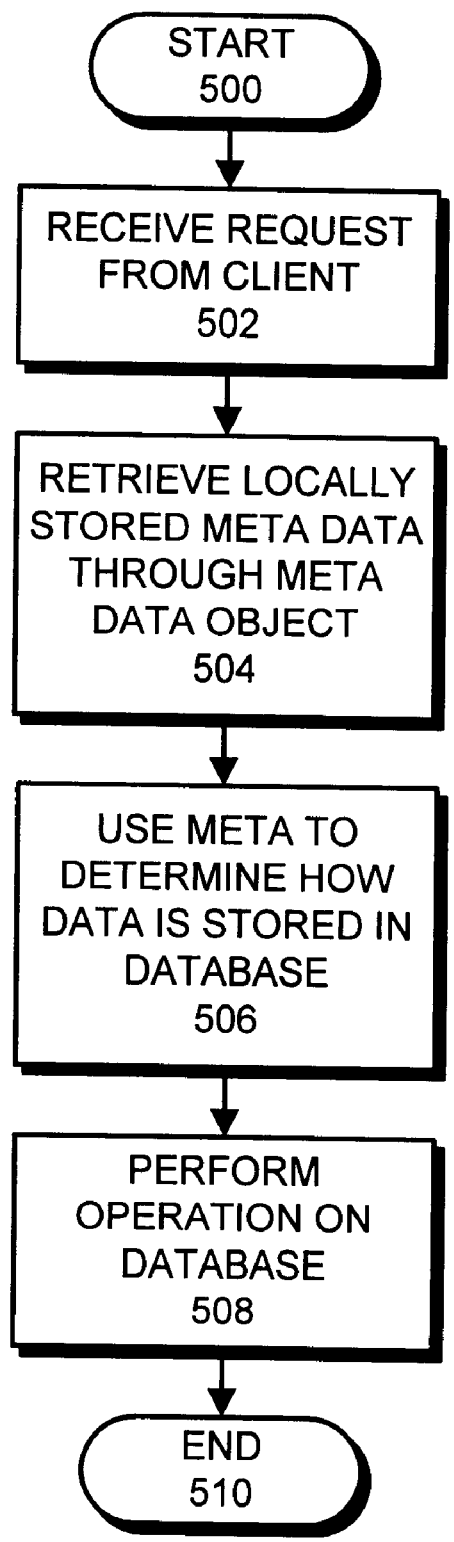
FIG. 5 is a flow chart illustrating the process of using metadata in accordance with an embodiment of the present invention.

FIG. 5 is a flow chart illustrating the process of using metadata in accordance with an embodiment of the present invention. The system starts by receiving a request from a client (step 502). For example, in FIG. 2 web server 114 can receive a request from client 102. This request can include any type of request involving static metadata. In one embodiment of the present invention, this request causes data 118 to be accessed from database 116.

In order to service this request, the system retrieves locally stored metadata through metadata object 222 (step 504). Note servicing this request involves accessing ASP 216, which executes a server-side script that accesses generic object 221. Generic object 221 in turn accesses metadata object 222, which retrieves metadata from locally stored metadata 224.

Note that locally stored metadata can be loaded from metadata 120 within database 116 through a number of methods. Under one method, the system includes a service that loads the metadata from database 116 before it is accessed. Under another method, if the needed metadata is not present within locally stored metadata 224, the system causes the needed metadata to be retrieved from metadata 120 within database 116. This needed metadata is also stored within locally stored metadata 224, so that the next time the same metadata is requested, it does not have to be retrieved from database 116.

Next, the retrieved metadata is used to determine how data associated with the request is organized in database 116 (step 506). This enables generic object 221 to perform the operation on data 118 within database 116 (step 508).

Note that the present invention allows static metadata to be stored locally within server 112. This eliminates accesses to database 116 to retrieve the metadata, and can thereby improve system performance. Furthermore, the present invention allows generic object 221 to be reused by different clients 102–103. This can greatly reduce the amount of memory used by a server that services many clients, such as web server 114.

EXAMPLE

Figure 6:
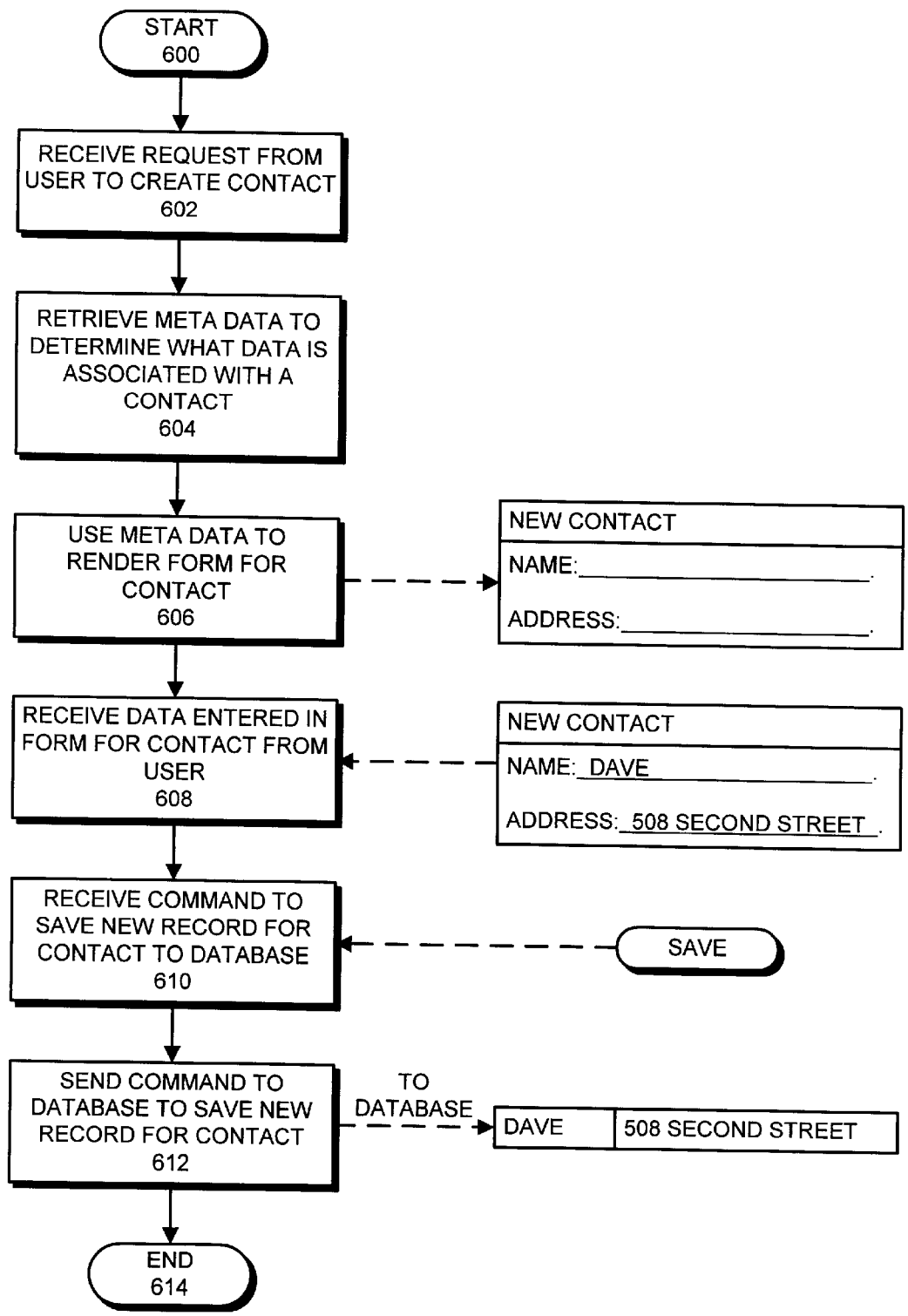
FIG. 6 is a flow chart illustrating an example of creating an entry for a contact in a database in accordance with an embodiment of the present invention.

FIG. 6 is a flow chart illustrating an example of creating an entry for a contact in a database in accordance with an embodiment of the present invention. The system starts by receiving a request from a user to create a contact for an address book application (step 602). This contact contains information pertaining to an entry in an address book. In creating the contact object, the system first creates a generic form. For example, the generic form can be defined by an ASP, such as ASP 216 in FIG. 2. ASP 216 calls generic object 221 to render the form.

In order to render the form, generic object 221 requires metadata that describes the layout of a form for a contact object. Generic object 221 requests this metadata by calling metadata object 222. Metadata object 222 in turn retrieves the metadata defining the form from locally stored metadata 224 (step 604). As was mentioned above, if this metadata is not present within locally stored metadata 224, it is retrieved from metadata 120 in database 116.

Next, the system uses the retrieved metadata to render a form for a new contact (step 606). As is illustrated in FIG. 6, this form includes a blank for the name of the contact and a blank for an address of the contact. This form is displayed to the user through a browser 106 within client 102. This allows the system to receive data entered into the form from the user of browser 106 (step 608). For example, in FIG. 6, the user enters his name "Dave" and his address "508 Second Street" into the form.

Next, the system receives a command from the user to save a new record for the contact in database 116 (step 610). The user enters this command by activating a "save" button associated with the form in browser 106.

Upon receiving the command to save (and/or create) the new contact, generic object creates an new contact object with the information received from the user, and sends a command to database 116 to create and/or populate a new record for the new contact object (step 612).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

Note that although the present invention is described with reference to a single server 112 containing a single web server 114, which communicates with a single middle layer 115 and a single database 116, the present invention can be applied to systems that potentially include multiple servers with multiple web servers, multiple middle layers and multiple databases.

Additionally, the above disclosure is not intended to limit the invention. The scope of the invention is defined by the appended claims.

What is claimed is:

1. A method for retrieving metadata from a memory within a server, so that the server does not have to access a database multiple times in order to retrieve the metadata, the method comprising:

receiving a request, at the server, from a client, the request causing an operation on data within the database;

in response to the request, retrieving the metadata through a metadata object, the metadata specifying how the data is stored within the database;

wherein the metadata object retrieves the metadata from a random access memory in the server;

wherein the metadata object is used by the server to service requests from a plurality of clients;

using the metadata to determine how the data is stored within the database; and performing the operation on the data within the database.

2. The method of claim 1, further comprising prior to receiving the request, starting a service that automatically loads metadata into random access memory.

3. The method of claim 1, further comprising if the metadata is not located within the random access memory in the server, retrieving the metadata from the database.

4. The method of claim 1, wherein the metadata object contains static metadata specifying how tables and views are organized within the database.

5. The method of claim 1, wherein the operation on the database includes one of, writing the data to the database, reading the data from the database, and creating an entry in the database.

6. The method of claim 1, wherein the metadata object is implemented as an object adhering to the common object model (COM) standard.

7. The method of claim 1, wherein receiving the request from the client includes receiving the request at a middle layer.

8. The method of claim 1, further comprising using the metadata to render a form for accepting the data from a user.

9. The method of claim 1, wherein accessing the metadata involves accessing the metadata object through a generic object.

10. A computer-readable storage medium storing instructions that when executed by a computer cause the computer to perform a method for retrieving metadata from a memory within a server, so that the server does not have to access a database multiple times in order to retrieve the metadata, the method comprising:

receiving a request, at the server, from a client, the request causing an operation on data within the database;

in response to the request, retrieving the metadata through a metadata object, the metadata specifying how the data is stored within the database;

wherein the metadata object retrieves the metadata from a random access memory in the server;

wherein the metadata object is used by the server to service requests from a plurality of clients;

using the metadata to determine how the data is stored within the database; and performing the operation on the data within the database.

11. The computer-readable storage medium of claim 10, further comprising prior to receiving the request, starting a service that automatically loads metadata into random access memory.

12. The computer-readable storage medium of claim 10, wherein the method further comprises retrieving the metadata from the database if the metadata is not located within the random access memory in the server.

13. The computer-readable storage medium of claim 10, wherein the metadata object contains static metadata specifying how tables and views are organized within the database.

14. The computer-readable storage medium of claim 10, wherein the operation on the database includes one of, writing the data to the database, reading the data from the database, and creating an entry in the database.

15. The computer-readable storage medium of claim 10, wherein the metadata object is implemented as an object adhering to the common object model (COM) standard.

16. The computer-readable storage medium of claim 10, wherein receiving the request from the client includes receiving the request at a middle layer.

17. The computer-readable storage medium of claim 10, wherein the method further comprises using the metadata to render a form for accepting the data from a user.

18. The computer-readable storage medium of claim 10, wherein accessing the metadata involves accessing the metadata object through a generic object.

19. An apparatus that retrieves metadata from a memory within a server, so that the server does not have to access a database multiple times in order to retrieve the metadata, the apparatus comprising:

a request receiving mechanism, within the server, that receives a request from a client, the request causing an operation on data within the database;

a metadata object, within the server, through which the server retrieves the metadata in response the request, the metadata specifying how the data is stored within the database;

wherein the metadata object is configured to retrieve the metadata from a random access memory in the server;

wherein the server is configured to use the metadata object to service requests from a plurality of clients; and an operation mechanism within the server that is configured to, use the metadata to determine how the data is stored within the database, and to initiate the operation on the data within the database.

20. The apparatus of claim 19, wherein the server includes a service that automatically loads metadata into random access memory prior to receiving the request.

21. The apparatus of claim 19, wherein the server is configured to retrieve the metadata from the database if the metadata is not located within the random access memory in the server.

22. The apparatus of claim 19, wherein the metadata object contains static metadata specifying how tables and views are organized within the database.

23. The apparatus of claim 19, wherein the operation on the database includes one of, writing the data to the database, reading the data from the database, and creating an entry in the database.

24. The apparatus of claim 19, wherein the metadata object is implemented as an object adhering to the common object model (COM) standard.

25. The apparatus of claim 19, wherein the request from the client is received at a middle layer.

26. The apparatus of claim 19, wherein the operation mechanism is configured to use the metadata to render a form for accepting the data from a user.

27. The apparatus of claim 19, further comprising a generic object on the server that is configured to retrieve the metadata by accessing the metadata object.

* * * * *